United States Patent [19]

Farooque

[11] Patent Number: 5,084,362
[45] Date of Patent: Jan. 28, 1992

[54] INTERNAL REFORMING MOLTEN CARBONATE FUEL CELL SYSTEM WITH METHANE FEED

[75] Inventor: Mohammad Farooque, Huntington, Conn.

[73] Assignee: Energy Research Corporation, Danbury, Conn.

[21] Appl. No.: 574,746

[22] Filed: Aug. 29, 1990

[51] Int. Cl.⁵ .............................. H01M 8/06
[52] U.S. Cl. ...................... 429/19; 429/20; 429/16
[58] Field of Search ............ 429/17, 19, 16, 20, 429/26, 30

[56] References Cited

U.S. PATENT DOCUMENTS

| | | | |
|---|---|---|---|
| 4,532,192 | 7/1985 | Baker et al. | 429/19 |
| 4,620,914 | 11/1986 | Abens et al. | 429/17 X |
| 4,791,033 | 12/1988 | Patel | 429/19 |
| 4,921,765 | 5/1990 | Gmeindl et al. | 429/16 |

*Primary Examiner*—Anthony Skapars
*Attorney, Agent, or Firm*—Robin, Blecker, Daley & Driscoll

[57] ABSTRACT

A fuel cell system in which a methane producing gasifier supplies methane fuel to an internal reforming fuel cell and unspent hydrogen from the anode exhaust of the fuel cell is used by the gasifier in processing the feedstock being converted by the gasifier to the methane fuel.

12 Claims, 1 Drawing Sheet

INTERNAL REFORMING MOLTEN CARBONATE FUEL CELL SYSTEM WITH METHANE FEED

BACKGROUND OF THE INVENTION

This invention relates to internal reforming fuel cell systems and, in particular, to internal reforming fuel cell systems which utilize methane as the fuel supply.

It is known that internal reforming fuel cells, such as, for example, internal reforming molten carbonate fuel cells, have high energy conversion efficiency when the fuel to the cells is methane. It is also known that in the production of methane by a gasifier, cold-gas efficiency is optimum when methane production is optimized.

These known factors have led to proposals for utilizing a methane producing gasifier in combination with an internal reforming fuel cell as a way of achieving an overall power plant with high thermal efficiency. Furthermore, studies have shown that such a power plant could provide a high overall coal to electrical energy conversion efficiency.

Typical methane producing gasifiers usually operate at lower temperatures and higher pressures than non-methane producing gasifiers. However, methane producing gasifiers require, in addition to their feedstock, quantities of hydrogen and steam for their endothermic hydro-gasification reactions. In presently proposed systems, this hydrogen is developed from the gasifier output, upstream of the fuel cell. While this offers a viable way of generating the required hydrogen, other more efficient ways are being sought.

It is, therefore, a primary object of the present invention to provide an internal reforming fuel cell system in which a methane gasifier is used in a way which better promotes the overall efficiency of system.

It is a further object of the present invention to provide an internal reforming fuel cell system in which improved efficiency of the overall system is achieved through the manner of developing the hydrogen for the methane gasifier of the system.

SUMMARY OF THE INVENTION

In accordance with the principles of the present invention, the above and other objectives are realized in a fuel cell system of the above-type by utilizing the unspent hydrogen in the anode exhaust stream of the fuel cell as the hydrogen for the methane gasifier.

In the embodiment of the invention to be disclosed hereinafter, the anode exhaust stream of the fuel cell is processed to separate and recover the unspent hydrogen from the remaining fuel components in the stream. The recovered hydrogen is then recycled to the gasifier input for aiding in its methane production.

In a further aspect of the invention, heat from the fuel cell is used to generate steam which is likewise recycled with the recovered hydrogen to the gasifier.

BRIEF DESCRIPTION OF THE DRAWINGS

The above and other features and aspects of the present invention will become more apparent upon reading the following detailed description in conjunction with the accompanying drawings in which the sole figure.

DETAILED DESCRIPTION

Figure 1:
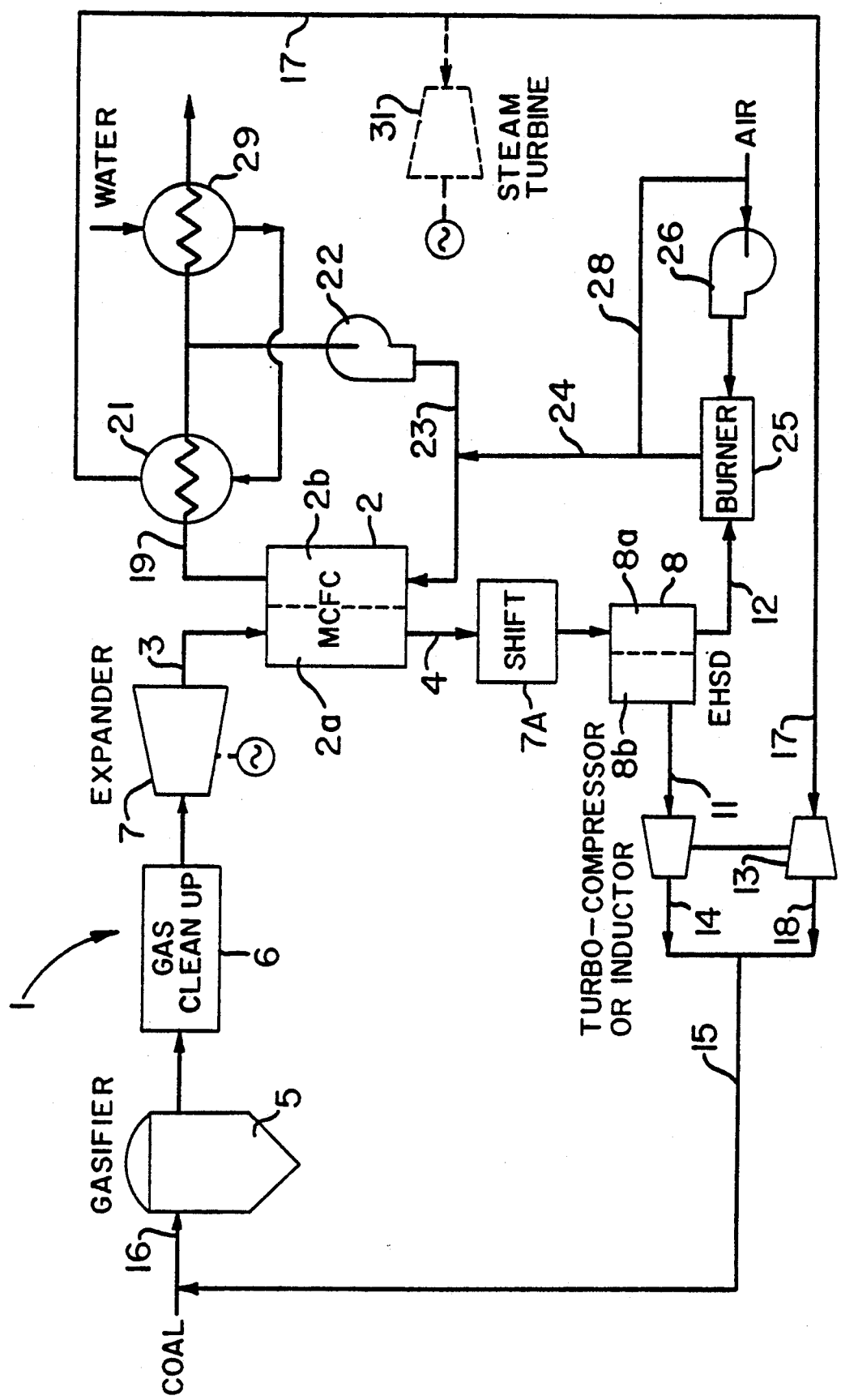
FIG. 1, shows a fuel cell system in accordance with the principles of the present invention.

FIG. 1 shows a fuel cell system 1 in accordance with the principles of the present invention. The fuel cell system 1 comprises a high or moderate temperature fuel cell 2 (i.e., one operating at a temperature of about 600° C. or above) having an anode section 2a and a cathode sections 2b.

For purposes of discussion, the fuel cell 2 is assumed to be a molten carbonate fuel cell, but the principles of the invention are applicable to other fuel cells as well. Other cells might be, for example, solid oxide fuel cells.

The cell 2 is also of an internal reforming type and supply fuel containing hydrocarbon content on an anode supply line 3, is reformed in the cell to produce hydrogen fuel process gas and oxides of carbon. Gas of this makeup thus flows through the anode section 2a and undergoes electrochemical reaction in the cell 2. This results in an anode exhaust stream containing unused or unspent hydrogen, water, small amounts of methane and carbon monoxide and substantial amounts of carbon dioxide. This anode exhaust stream is delivered from the anode section 2a to an anode exhaust line 4.

To promote overall efficiency of the system 1, the supply fuel used for the fuel cell 2 and delivered to the supply line 3 comprises methane. The methane fuel is generated by a conventional methane producing gasifier 5. Gasifiers of this type typically operate at a relatively low operating temperature ($<1400°$ F.) and generate methane from feedstocks such as, for example, coal feedstocks as shown in the figure.

In the case illustrated, before reaching the anode supply line 3, the gasifier output passes through a gas clean up device 6 to remove impurities. The gas clean-up device may be a cold or hot clean up device and, after passing through the device 6, the gasifier output passes through an expander 7 which adjusts the gas pressure to that of the fuel cell. The expander may be used to generate part of the system power and is employed because the gasifier 5 operates at a much higher pressure than the fuel cell 2, thereby requiring a reduction in the pressure of the gasifier output before being to introduced into the cell.

In order for the gasifier 5 to process the input coal feedstock, it is additionally necessary that the gasifier be provided with hydrogen and steam to sustain the gasifier reactions. In accordance with the principles of the present invention, the hydrogen required for the gasifier 5 is derived from the fuel cell itself and, in particular, from the unspent hydrogen in the anode exhaust stream. In further accord with the invention, the steam needed for the gasifier 5 is derived also by using the fuel cell 2 and, in particular, by using waste heat generated by the cell. Specifically, the exhaust gas stream from the cathode section 2b is used for this purpose.

More particularly, as shown in FIG. 1, the anode exhaust stream in the line 4 is first fed through a shift converter 7A which increases the hydrogen content in the stream by converting any CO in the stream to hydrogen. After shift converting, the exhaust stream is fed to a hydrogen separation and recovery device 8 which separates and recovers the unspent hydrogen in the stream from the other constituents.

In the case shown, the device 8 is in the form of a hydrogen transfer device (HTD) of the type disclosed in U.S. Pat. No. 4,620,914, commonly assigned to the assignee hereof, and the teachings of which are incorporated herein by reference. The exhaust gas stream is received in the anode section 8a of the HTD 8 and unspent hydrogen gas is transferred from the latter section to the cathode section 8b of the HTD and recovered on line 11. The remaining gases in the exhaust stream exit the anode section 8a of the HTD on line 12.

The recovered hydrogen gas from the HTD 8 on line 11 is fed through compressor or a turbo-compressor or an inductor 13 to increase its pressure. The pressurized hydrogen is then delivered via lines 14 and 15 to the input feed line 16 to the gasifier. The turbo compressor 13, if employed, is driven by high pressure steam delivered to the compressor on line 17. The steam leaves the turbocompressor on line 18 and is combined with the hydrogen from line 14 for delivery to the gasifier.

The steam fed to the turbocompressor 13 is generated using the waste heat in the cathode exhaust stream 2 on line 19. Thus, this stream, which is at a high temperature (about 1150° F.) and a high pressure (about 1500 psi), is placed in heat exchange with water in a heat exchanger or boiler 21. The resultant steam from the boiler is then delivered to line 17 which, as above-indicated, feeds the turbo-compressor 13.

The cathode exhaust stream on line 19, after passing through the boiler 21, is then partially recirculated, via a blower 22, which recirculates some of the stream back to the cathode supply line 23 of cathode section 2b. The cathode exhaust not recirculated is used to preheat the water being fed to the boiler 21 by passing it and the water through a further heat exchanger 29. Oxidant process gas on line 24 is also supplied to line 23 from an air supply line 28 and from a burner 25. The burner 25 is fed fresh supply air from a further blower 26.

The burner 25 is also fed the remaining anode exhaust stream delivered to line 12 from the HTD 8. The fuel content in this gas is burnt in the burner 25, while the carbon dioxide is passed with oxygen to the line 24.

As can be appreciated, the amount of hydrogen available in the anode exhaust stream of the fuel cell 2 depends upon the fuel utilization of the cell. In operation of the system 1, this utilization would, if possible depending upon the system constraints, be adjusted so that the unspent hydrogen available for recycling to the gasifier 5 is sufficient to fill the gasifier requirements. In the event the available hydrogen were not sufficient, additional hydrogen from other sources could be added to the recycled hydrogen to meet the gasifier needs.

By use in the system 1 of the unspent hydrogen in the fuel cell anode exhaust stream for the methane gasifier 5, the overall efficiency of the system 1 is enhanced. Similarly, a further enhancement in efficiency results when generating the steam for the gasifier from the fuel cell waste heat.

It is also possible that the cathode exhaust waste heat may provide more steam than required by the gasifier 5. In that case, a steam turbine 31 can be added to the system to produce additional power from this excess steam.

In all cases, it is understood that the above-identified arrangements are merely illustrative of the many possible specific embodiments which represent applications of the present invention Numerous and varied other arrangements can readily be devised in accordance with the principles of the present invention without departing from the spirit and scope of the invention. Thus, for example, the gasifier 5 might be provided with a catalyst to enhance the reaction rate of the gasifier. Also, the heat exchangers 21 and 29 can be operated such that the exchanger 29 forms steam and the exchanger 21 super heats the steam. Additionally, these elements can be formed as a single heat exchanger unit.

What is claimed is:

1. A fuel cell system comprising:

a methane producing gasifier for converting feedstock in the presence of hydrogen and steam into methane fuel process gas;

an internal reforming fuel cell in which said methane gas is converted into fuel process gas containing hydrogen and which includes an anode section for receiving said fuel process gas and a cathode section for receiving oxidant process gas, said anode section producing an exhaust stream including unspent hydrogen and carbon dioxide;

and means for recycling to said greater a portion of said exhaust stream inclusive of said unspent hydrogen and exclusive of said carbon dioxide.

2. A fuel cell system in accordance with claim 1 wherein:

said internal reforming fuel cell is a cell operating at temperatures at or above about 600° C.

3. A fuel cell system in accordance with claim 1 wherein:

said fuel cell is a molten carbonate fuel cell.

4. A fuel cell system in accordance with claim 1 wherein:

said fuel cell system is adjusted to operate at a hydrogen utilization which results in unspent hydrogen in said anode exhaust stream sufficient to meet the requirements of said gasifier for hydrogen.

5. A fuel cell system in accordance with claim 1 wherein:

said recycling means includes shift converter means for converting carbon monoxide in said anode exhaust stream to hydrogen to increase the level of unspent hydrogen in said anode exhaust stream prior to said portion of paid anode exhaust stream being recycled to said gasifier.

6. A fuel cell system in accordance with claim 1 further comprising:

means responsive to the heat generated from said fuel cell for generating steam;

and means for conveying said steam to said gasifier.

7. A fuel cell system in accordance with claim 6 wherein:

said recycling means and conveying means jointly comprise: first means driven by said steam for increasing the pressure of said unspent hydrogen; and means for coupling said pressurized hydrogen and said steam from said first means to said gasifier.

8. A fuel system in accordance with claim 6 wherein: said steam generating means comprises: means for placing the exhaust stream from the cathode section of said fuel cell in heat exchange with water.

9. A fuel cell system in accordance with claim 1 wherein:

said recycling means comprises: means for separating said unspent hydrogen from the remaining constituents including said carbon dioxide in said anode exhaust stream to form said portion of said anode exhaust stream; and said recycling means recycles said separated unspent hydrogen to said gasifier.

10. A fuel cell system in accordance with claim 9 wherein:

said separating means comprising a hydrogen transfer device.

11. A fuel cell system in accordance with claim 9 further comprising:

a burner responsive to said remaining constituents including said carbon dioxide in said anode exhaust stream and to a source of oxygen for generating oxidant process gas for said cathode section of said fuel cell.

12. A fuel cell system in accordance with claim 1 wherein:

said feedstock is coal.

* * * * *

UNITED STATES PATENT AND TRADEMARK OFFICE
CERTIFICATE OF CORRECTION

PATENT NO. : 5,084,362
DATED : January 28, 1992
INVENTOR(S) : Mohammad Farooque

It is certified that error appears in the above-identified patent and that said Letters Patent is hereby corrected as shown below:

Col. 2, line 36.  After "expander" insert 7

Col. 2, line 40.  Delete "to"

Col. 4, line 10.  Change "greater" to -- gasifier --

Col. 4, line 31.  Change "paid" to -- said --

Signed and Sealed this

Twenty-ninth Day of March, 1994

Attest:

BRUCE LEHMAN

Attesting Officer          Commissioner of Patents and Trademarks